Patented Nov. 22, 1949

2,488,885

UNITED STATES PATENT OFFICE 2,488,885

THE MANUFACTURE OF SODIUM DIETHYLMETANILATE

Charles H. W. Whitaker, Marietta, Ohio, assignor to American Cyanamid Company, New York, N. Y., a corporation of Maine No Drawing. Application May 7, 1947, Serial No. 746,638

10 Claims. (Cl. 260—508)

This invention relates to an improvement in the process for the manufacture of sodium diethylmetanilate and more specifically to improvements in the recovery of sodium diethylmetanilate from reaction mixtures containing it.

Sodium diethylmetanilate, which is an intermediate for a number of compounds, particularly phthalein dyes, is normally prepared by the alkylation of salts of metanilic acid using well known ethylating agents such as ethyl halides and diethyl sulfate. It is common to carry out the reaction in an aqueous medium.

The process used in making sodium diethylmetanilate, while effective from the reaction standpoint, presents a serious problem in the economic recovery of the sodium diethylmetanilate from the reaction mixture which is an aqueous slurry containing a complex mixture of dissolved and undissolved inorganic salts. The problem is complicated by the fact that it is necessary for many uses to obtain the sodium diethylmetanilate in a very high state of purity. Thus, for example, small amounts of mineral salts cause extensive tar formation and lower the yield when the salt is transformed into corresponding phenol by alkali fusion.

In the past the isolation of sodium diethylmetanilate has been attempted by various methods one of which involves salting out with large excesses of caustic soda. The procedure is effective but does not produce a compound sufficiently pure for use in fusion reactions and the concentrated caustic solution which has to be handled results in equipment problems and operation difficulties.

Another method which has been proposed in the past involves extraction with aqueous ethyl alcohol. This process also does not produce a product sufficiently pure for fusion reactions and the high solubility of ethyl alcohol in water results in considerable loss of the solvent.

According to the present invention sodium diethylmetanilate is extracted from the ethylation reaction mixture by the use of hydroxylated solvents having only a limited solubility in the brine solution represented by the reaction mixture. The dissolved sodium diethylmetanilate is readily isolated by known methods such as by distillation of the solvent under vacuum.

One of the great advantages of the present invention is that the sodium diethylmetanilate is recovered almost quantitatively and is of such high purity that it can be used directly in caustic fusions. The process of the present invention, therefore, improves both the purity and the yield, an unusual result, since ordinarily, in extraction processes, an increase in purity involves loss in recovery.

Another advantage of the process is that it may be used with reaction mixtures to which sulfuric acid has been added to precipitate calcium ions and sodium carbonate to precipitate magnesium ions.

The solvents to be used in the present invention include mono hydroxylated compounds having from four to nine carbon atoms in which the hydroxyl group is the only functional group in the molecule. Both alcohols and phenols falling within the above range are usable.

While it is necessary that the solvent should have a relatively high solvent action for sodium diethylmetanilate combined with a low solvent action for inorganic salts it is not necessary that this solubility differential exist at room temperature. The process of the present invention is not at all critical as to temperature and any temperature can be used at which the solubility differential is a maximum.

A number of solvents possess the requirements stated above and are useable in the process of the present invention. Typical examples are aliphatic alcohols, such as n-butyl alcohol, tert.-butyl alcohol, sec.-butyl alcohol, amyl alcohol, isoamyl alcohol, methyl isobutyl carbinol, and hexyl alcohol. Another class of alcohols are the aralkyl alcohols such as benzyl alcohol and phenolic compounds such as phenol, cresols, xylenols and the like. Cyclo aliphatic alcohols such as cyclohexyl alcohol, methylcyclo-hexyl alcohol and the like are also usable. Heterocyclo alcohols such as furfuryl alcohol, tetrahydrofurfuryl alcohol, and the like are also usable.

That is, as shown ante, various phenols and alcohols may be employed as the organic solvent in the practice of the present invention and generically, these organic solvents may be represented by the following formula R—OH wherein R is a hydrocarbon radical containing from 4 to 9 carbon atoms.

The solvent should be substantially insoluble or have only very low solubility in the solution of inorganic salts which constitutes the reaction mixture because a sharp separation of the aqueous and organic solvent layers is necessary for maximum recovery of pure sodium diethylmetanilate and solvent. It is, however, not at all necessary that the solvent be insoluble in water. In fact, some of the solvents used in the process of the present invention are quite soluble in water and a few are completely miscible. The solubility of the solvent in water is immaterial since the extraction is done from a solution containing large amounts of dissolved salts. It is only the solubility of the solvent in this brine which is important.

It is an advantage of the present invention that it operates smoothly and reliably and requires neither delicate control nor special equipment. The high recovery of solvent which is readily obtainable also makes for an economical process. Another advantage of the process is that it is adaptable to a continuous process in which the amount of solvent in the entire system can be relatively small at all times. Such continuous extraction processes, which may be advantageously operated in counter current, constitute the preferred embodiment of the invention, although the high recovery and purity of the product is obtained equally in batch processes.

The invention will be described in more detail in conjunction with the following specific examples. Parts are by weight.

*Example 1*

395 parts of metanilic acid and 100 parts of lime are boiled together in water and the resulting solution filtered. This solution of calcium metanilate is charged into a pressure autoclave together with 400 parts of ethyl chloride, and 150 parts of magnesium oxide. The autoclave is sealed and heated to 110° to 160° C. until the reaction is substantially complete as shown by no further drop in pressure. The charge is removed from the autoclave using a large excess of water. Sufficient sulfuric acid is added to the mixture to make it acidic to Congo red paper and precipitate the calcium ions as calcium sulfate. The mixture is then boiled and enough sodium carbonate added to precipitate the magnesium ions as magnesium carbonate. At this point salt is added to reduce the solubility of the sodium diethylmetanilate in the aqueous phase. The sodium diethylmetanilate is separated from the resulting slurry by continuous extraction with a mixture of amyl alcohols having a boiling range of 112° to 140° C. until recovery is substantially complete. The solvent is removed by vacuum distillation to give a high yield of sodium diethylmetanilate of very good purity.

*Example 2*

395 parts of metanilic acid and 100 parts of lime are boiled together in water and the resulting solution filtered. This solution of calcium metanilate is charged into a pressure autoclave together with 400 parts of ethyl chloride, and 150 parts of magnesium oxide. The autoclave is sealed and heated to 110° to 160° C. until the reaction is substantially complete as shown by no further drop in pressure. The charge is removed from the autoclave using a large excess of water. Sufficient sulfuric acid is added to the mixture to make it acidic to Congo red paper and precipitate the calcium ions as calcium sulfate. The mixture is then boiled and enough sodium carbonate added to precipitate the magnesium ions as magnesium carbonate. At this point salt is added to reduce the solubility of the sodium diethylmetanilate in the aqueous phase. The sodium diethylmetanilate is separated from the resulting slurry by continuous extraction with normal butyl alcohol. The solvent is removed by vacuum distillation to give a high yield of sodium diethylmetanilate of very good purity.

*Example 3*

A slurry of sodium diethylmetanilate containing inorganic salts is prepared as described in Example 1. The sodium diethylmetanilate is then separated from the resulting slurry by continuous action with benzyl alcohol until recovery is substantially complete. The solvent is then removed by vacuum distillation and a high yield of sodium diethylmetanilate of very good purity is then obtained.

*Example 4*

A slurry of sodium diethylmetanilate containing inorganic salts is prepared as described in Example 1. The sodium diethylmetanilate is separated from the slurry by continuous extraction with cyclohexyl alcohol until recovery is substantially complete. The solvent is removed by vacuum distillation to give a high yield of sodium diethylmetanilate of very good purity.

*Example 5*

A slurry of sodium diethylmetanilate containing inorganic salts is prepared as described in Example 1. The sodium diethylmetanilate is separated from the slurry by continuous extraction with phenol until recovery is substantially complete. The solvent is removed by vacuum distillation to give a high yield of sodium diethylmetanilate of very good purity.

*Example 6*

A slurry of sodium diethylmetanilate containing inorganic salts is prepared as described in Example 1. The sodium diethylmetanilate is then separated from the resulting slurry by continuous action with mixed isomeric cresols until recovery is substantially complete. The solvent is then removed by vacuum distillation and a high yield of sodium diethylmetanilate of very good purity is then obtained.

I claim:

1. An improved process for recovering sodium diethylmetanilate from an aqueous slurry containing inorganic salts and sodium diethylmetanilate which comprises bringing said aqueous slurry into interfacial contact with an organic liquid having a high solvent action for sodium diethylmetanilate and a low solvent action for inorganic salts until a solution of sodium diethylmetanilate is formed with said organic liquid, said aqueous slurry containing an amount of inorganic salts sufficient to form a brine with which said organic liquid forms a sharply defined interface and said organic liquid having the formula R—OH wherein R is a radical selected from the group consisting of open chain hydrocarbon radicals having 4-9 carbon atoms, hydrocarbon radicals containing a six-membered ring and having 6-9 carbon atoms, furfuryl and hydrogenated furfuryl radicals, thereafter separating said organic liquid containing dissolved sodium diethylmetanilate from said brine and recovering sodium diethylmetanilate from said organic liquid.

2. The process of claim 1 wherein said organic liquid is a butyl alcohol.

3. The process of claim 1 wherein said organic liquid is an amyl alcohol.

4. The process of claim 1 wherein said organic liquid is a cycloaliphatic alcohol.

5. The process of claim 1 wherein said organic liquid is a cyclohexyl alcohol.

6. The process of claim 1 wherein said sodium diethylmetanilate is extracted from said aqueous slurry by continuously extracting the same with said organic liquid.

7. The process of claim 1 wherein said sodium diethylmetanilate is isolated from said organic liquid containing dissolved sodium diethylmetanilate by removing the organic liquid by vacuum distillation.

8. In a process for the preparation of sodium diethylmetanilate by the reaction of a water soluble metanilate with an ethylating agent in an aqueous medium in the presence of an acid binder and subsequent conversion to the sodium salt, the step which comprises bringing said aqueous slurry into interfacial contact with an organic liquid having a high solvent action for sodium diethylmetanilate and a low solvent action for inorganic salts whereby a solution of sodium diethylmetanilate is formed with said organic liquid, separating said organic liquid containing dissolved sodium diethylmetanilate from the aqueous phase containing said inorganic salts and recovering sodium diethylmetanilate from said organic liquid, said organic liquid being substantially immiscible with said aqueous slurry and having the formula R—OH wherein R is a radical selected from the group consisting of open chain hydrocarbon radicals having 4–9 carbon atoms, hydrocarbon radicals containing a six-membered ring and having 6–9 carbon atoms, furfuryl and hydrogenated furfuryl radicals.

9. The process of claim 8 wherein said organic liquid is a butyl alcohol.

10. The process of claim 8 wherein said sodium diethylmetanilate is extracted from said aqueous slurry by continuously extracting the same with said organic liquid and said sodium diethylmetanilate is isolated from said organic liquid containing dissolved sodium diethylmetanilate by removing the organic liquid by vacuum distillation.

CHARLES H. W. WHITAKER.

REFERENCES CITED

The following references are of record in the file of this patent:

UNITED STATES PATENTS

| Number | Name | Date |
| --- | --- | --- |
| 2,067,463 | Schirm | Jan. 12, 1937 |

OTHER REFERENCES

Chemical Abstracts, vol. 34, p. 32464 (1940).